United States Patent Office 2,732,350
Patented Jan. 24, 1956

2,732,350

POLYELECTROLYTES COMPRISING COPOLYMERS OF VINYL AROMATIC COMPOUNDS AND COMPOUNDS CONTAINING ALKYL VINYL PYRIDINIUM

John T. Clarke, Newton Highlands, Mass., assignor to Ionics, Incorporated, Cambridge, Mass., a corporation of Massachusetts No Drawing. Application January 22, 1953,
Serial No. 332,744

11 Claims. (Cl. 260—2.1)

This invention pertains to polyelectrolytes comprising copolymers of vinyl aromatic compounds and compounds containing the alkyl vinyl pyridinium group:

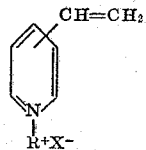

where R is an alkyl group and X is an anion. Such polyelectrolytes may be prepared as either linear soluble copolymers or as cross-linked insoluble copolymers depending upon whether the vinyl aromatic compound contains one or a plurality of vinyl groups.

Linear polyelectrolytes containing the alkyl vinyl pyridinium group have been prepared in the past in the form of homopolymers by polymerizing an alkyl vinyl pyridinium salt. Such compounds, however, have been found to contain about 40% polymer of low molecular weight, and in the presence of alkali, they degrade entirely to a low molecular weight material.

Both linear and cross-linked polyelectrolytes containing the alkyl vinyl pyridinium group have also been prepared by polymerizing or copolymerizing vinyl pyridine or vinyl quinoline, and subsequently alkylating the polymeric material. The principal disadvantage of this process is that alkylation is not complete, rarely in excess of 70% of the theoretical maximum, thus resulting in a material that contains less than the maximum amount of dissociable groups.

The present invention provides a process for producing high molecular weight polymeric materials that are stable to both acids and alkalis, and in which there is complete alkylation of the nitrogen atoms. Linear materials of this type are soluble in water and film forming, and have been found to possess powerful bacteriostatic action and also to have excellent adhesion characteristics. They may thus be used as antiseptics, or as bateriocidal films, and are also useful as precipitating agents for negatively charged colloids, and as mordants. Insoluble cross-linked materials of this type have excellent ion-exchange properties and may be prepared as granular anion exchange resins, or as membranes selectively permeable to anions and useful in electrodialysis.

This invention involves the steps of first preparing a monomeric material containing the alkyl vinyl pyridinium group and then copolymerizing the pyridinium compound with a vinyl aromatic compound. In preparing an alkyl vinyl pyridinium compound, vinyl pyridine or vinyl quinoline or their ring-substituted alkyl derivatives (all of which are referred to herein generally as vinyl pyridine compounds) may be used, including as examples: 2-vinyl pyridine; 3-vinyl pyridine; 4 vinyl pyridine; 2 vinyl 5 ethyl pyridine; 2 methyl 5 vinyl pyridine; 2 vinyl 6 methyl pyridine; 2 methyl 4 vinyl pyridine; 2 vinyl 4, 6, dimethyl pyridine; 2 vinyl quinoline etc. These compounds are alkylated by reatcing them with ordinary alkylating agents, for instance, dialkyl sulfates such as dimethyl sulfate, diethyl sulfate, di-isopropyl sulfates, etc.; alkyl aryl sulfonates such as methyl p-toluene sulfonate, n-butyl p-toluene sulfonate, methyl benzene sulfonate, n-hexyl benzene sulfonate, n-lauryl benzene sulfonate; and alkyl halides such as methyl chloride, ethyl bromide, etc. The reaction proceeds according to the general equation:

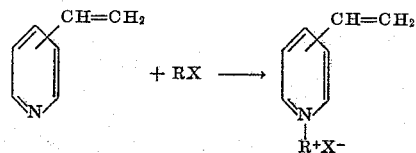

and is preferably carried out in a solution of the vinyl pyridine compound at a temperature sufficiently low to prevent homopolymerization of the alkyl vinyl pyridinium salt.

The alkyl vinyl pyridinium salt, after complete alkylation, is then combined with a vinyl aromatic compound (or alpha-substituted alkyl derivative thereof) in a common solvent, and the mixture is heated to effect polymerization. To produce linear copolymers a monovinyl aromatic compound, such as styrene, vinyl toluene, chlorostyrene, alpha methyl styrene, p-methyl alpha methyl styrene or other polymerizable aromatic compounds containing the group:

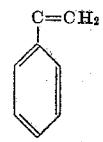

is copolymerized with the alkyl vinyl pyridinium salt. Cross-linked copolymers are produced by copolymerizing the alkyl vinyl pyridinium salt with a polyvinyl aromatic compound; such as divinyl benzene, di isopropenyl benzene or other aromatic compounds having two or more

joined to aromatic nuclei. The polyvinyl compound may be the only material copolymerized with the alkyl vinyl pyridinium salt, or it may be used in conjunction with a monovinyl aromatic compound to produce copolymers having a lesser degree of cross linking.

Suitable solvents in which the alkyl vinyl pyridinium salt and the vinyl aromatic compound may be dissolved include in general alcoholic compounds such as methanol, ethanol, ethylene glycol, ethylene glycol monomethyl ether, isopropanol, β-hydroxy-ethyl acetate etc., or other common solvents.

It has been observed that there is a strong tendency for the alkyl vinyl pyridinium salt to copolymerize in about a 1:1 ratio with the vinyl groups of the vinyl aromatic compound, although copolymers having a pyridinium salt-vinyl aromatic ratio of between about 2:1 and 8:9 can be produced by appropriately controlling the relative amounts of the two classes of ingredients. It has also been observed that copolymerization only proceeds if all of the vinyl pyridine compound is alkylated, and this apparently by the ionic mechanism, for copolymerization proceeds in the presence of typical inhibitors of the ordinary so-called free radical polymerization. If less than all of the vinyl pyridine compound is alkylated, polymerization does not occur, even in the presence of typical free radical catalysts, such as benzoyl peroxide.

Copolymerization may be carried out in the temperature range of 20° to 150° C., but the 60°–110° C. range is preferred.

The following examples of this invention have been selected for purposes of illustration and describe in detail the best manner that has been found of carrying out the invention. In the examples the preferred vinyl pyridine compounds are 2-vinyl pyridine and 4-vinyl pyridine, the preferred monovinyl aromatic compounds are styrene and alpha methyl styrene, and the preferred polyvinyl compound is divinyl benzene. Dimethyl sulfate is preferred for alkylation.

In Examples 1 through 3 the inherent viscosity is defined as the natural logarithm of the relative viscosity divided by the concentration in grams per 100 cc. Unless otherwise specified, the concentration is 1 gram per 100 cc.

EXAMPLE 1

*Copolymerization of N-methyl-2-vinylpyridinium methosulfate and styrene*

To a mixture of 16.3 cc. (0.15 mol) of 2-vinylpyridine (containing 0.05% hydroquinone) and 20 cc. of methanol was added 16.0 cc. (0.17 mol) of dimethyl sulfate, while stirring the mixture, at a rate to maintain the temperature between 55 and 65° C. The reaction was completed in 20 minutes and the mixture was distinctly acid and free of unreacted vinylpyridine. This mixture, containing N-methyl-2-vinylpyridinium methosulfate, was then combined with a solution consisting of 17.2 cc. (0.15 mol) of styrene monomer (containing inhibitor) dissolved in 150 cc. of methanol, and the mixture was boiled under reflux for 20 hours.

The polymeric product was recovered from the reaction mixture by adding and mixing in 200 cc. of acetone to precipitate out the copolymer, which was then filtered off and dried at 110° C. for several hours. An analysis of the material showed that the methosulfate group had hydrolyzed to bisulfate and that the material contained 55.08% carbon, 6.49% hydrogen, and 4.20% nitrogen. The copolymer was readily soluble in water and methanol and was stable to both acids and alkalies. The copolymer contained the vinylpyridinium salt and the styrene in the molar ratio of approximately 5:4. A methanol solution of the copolymer containing 0.52 gram per 100 cc. of solution had an inherent viscosity of 3.1.

EXAMPLE 2

*Copolymerization of N-methyl-4-pyridinium methosulfate and styrene*

To a solution of 10 cc. of freshly distilled 4-vinylpyridine (containing 0.02% di-t-butylhydroquinone) in 16 cc. of methanol was added slowly while stirring 9.5 cc. of dimethyl sulfate, while the reaction temperature was maintained by external cooling between 15 and 25° C. The reaction was complete in 40 minutes, at which time, a mixture of 10.8 cc. styrene and 16 cc. methanol was added and the mixture was boiled under reflux for 4 hours. The reaction mixture was then diluted with 40 cc. of methanol, and then mixed with 300 cc. of acetone to cause the copolymer to precipitate. The precipitate was finally filtered from the supernatant liquid and dried at 110° C. The copolymer, a yellow powder, was readily soluble in water, giving a viscous clear solution, and was stable to both acids and alkalies. It contained the vinylpyridinium salt and styrene in the molar ratio of approximately 5:3. In a solution containing 1.00 gram per 100 cc. of solution, its inherent viscosity was 1.63.

EXAMPLE 3

*Copolymerization of N-methyl-2-vinylpyridinium methosulfate and alpha-methyl-styrene*

To a solution containing 10.8 cc. of 2-vinylpyridine and 8 cc. of methanol was added slowly, while stirring, 10 cc. of dimethyl sulfate at a rate to maintain the reaction temperature between 55 and 65° C. After 20 minutes, 12.9 cc. of alpha-methylstyrene dissolved in 8 cc. of methanol was added to the solution and the mixture was heated at 50° C. for 15 hours. The solvent and unreacted monomeric alpha-methyl-styrene were then evaporated from the reaction mixture by baking the reaction mixture at 100° C. The copolymer was readily soluble in water and was stable to both acids and alkalies. The polymer contained the vinylpyridinium salt and the alpha-methyl-styrene in the molar ratio of approximately 7:6. In a solution containing 1.00 gram per 100 cc. of solution, the inherent viscosity of the copolymer was 0.48.

In the foregoing examples, approximately equal molar amounts of the vinylpyridinium salt and the mono vinyl aromatic compound were combined and reacted to produce a copolymer containing these materials in approximately equal molar amounts. By varying the molar ratios of the vinylpyridinium salt and the monovinyl aromatic compound, the relative molar amounts of these materials in the final copolymer can also be varied to a certain extent. For instance, a reaction mixture containing the vinylpyridinium salt and styrene in a ratio of 4:3 produced a copolymer containing these materials in a molar ratio of 4:2; and a reaction mixture containing the vinylpyridinium salt and styrene in the molar ratio of 1:4 produced a copolymer in which these components were present in the molar ratio of 8:9.

The inherent viscosities of solutions of the copolymers indicate that the copolymers are of high molecular weight of the order of magnitude of 200,000. This contrasts sharply with homopolymers prepared by polymerizing vinylpyridinium salts alone. Such polymers contain a large fraction of low molecular weight material having an inherent viscosity of about 0.01.

Insoluble cross-linked copolymers in the form of granules or large dimensioned structures such as membranes, having two dimensions greater than 1 cm. and a thickness of about 0.5 millimeter or more, may be prepared by copolymerizing the vinylpyridinium salt with a polyvinyl aromatic compound in place of or in addition to the monovinyl aromatic compound, in the manner described in the foregoing examples. In preparing membranes or other large dimensioned structures, however, it is necessary that final polymerization occur under non-evaporative conditions such as in a closed mold or in an atmosphere saturated with vapors of the solvent in which the ingredients are dissolved, in order to prevent fracturing of the structure.

EXAMPLE 4

*Preparation of a membrane consisting of a copolymer and methyl-2-vinylpyridine methosulfate and divinylbenzene*

Thirty-six cc. of 2-vinylpyridine, containing 0.1% hydroquinone, were dissolved in 40 cc. of isopropanol and the solution was warmed to 55° C., and 36 cc. of dimethyl sulfate were added slowly while stirring, at a rate to maintain the temperature below 65° C. After about 10 minutes the solution was cooled to room temperature (25° C.) and 36 cc. of commercial (40–50%) divinylbenzene (containing by analysis 33 mol per cent divinylbenzene in solution with ethylstyrene) were added. The mixture was warmed to 40° C. and stirred until homogeneous, and then cast between parallel glass plates spaced 1 millimeter apart and then held at 65° C. in an oven for 5 hours to effect complete polymerization. During polymerization, evaporation of solvent into the space between the plates beyond the area occupied by the cast occurred only at the edges of the cast. The dried edges sealed the interior of the cast from additional evaporation of solvent. The dried edges were trimmed off and discarded after polymerization and cooling of the membrane. After the membrane had cooled, it was removed from between the plates and leached in water to remove the solvent and convert the memberane to the form of an aqueous gel. The membrane was thereafter converted from the methylsulfate form to the chloride form by leaching it first in a solution of 0.3 N sodium chloride and then in a solution of 1.0 N sodium chloride, and finally, again in water to remove excess chloride. The membrane in this form was found to contain 61% by weight of water and had an ion exchange capacity of 3.48 milliequivalents per dry gram. The specific resistivity was determined to be 45 ohm centimeters.

A membrane of this type consists of a solid solvated gel having as a skeletal structure, an insoluble infusible polymeric matrix that includes dissociable vinylpyridinium salt groups. The dissociable salt groups distributed throughout the matrix impart to the structures a fixed cationic charge electrostatically associated with a mobile replaceable anion. These materials thus exhibit anion exchange characteristics and in addition, are selectively permeable and electrically conductive.

In addition to the electrical properties, the membranes of this invention are mechanically durable and substantially hydraulically impermeable, and may thus be used as hydraulic separators, particularly in the field of electrodialysis, for instance, in the processes and apparatus disclosed in the following copending applications:

Walter Juda and Wayne A. McRae, Ser. No. 146,706 filed February 28, 1950, now Pat. No. 2,636,852, issued April 28, 1953;

Walter Juda and Wayne A. McRae, Ser. No. 207,289 filed January 23, 1951;

Davis R. Dewey II and Edwin R. Gilliland, Ser. No. 213,514 filed March 2, 1951; and William E. Katz and Norman W. Rosenberg, Ser. No. 300,302 filed July 22, 1952.

By effecting polymerization of the monomeric ingredients while they are dissolved in a common solvent and under conditions preventive of the evaporation of solvent, the polymerization proceeds in solution to form an insoluble, infusible cross-linked matrix that uniformly permeates the mass of solution and occludes the solvent as the liquid phase of a coherent homogeneous gel. The polymeric matrix is thus formed to accommodate the liquid phase and is not swollen by it, resulting in a highly solvated gel having an unstressed matrix.

In preparing membranes, the polymerizing ingredients are preferably combined in the following proportions:

Polyvinyl aromatic compound_____ 1 mol
Alkyl vinylpyridinium compound_____ 1–3 mols
Monovinyl aromatic compound_____ 0–1 mol between 20 and 70, and preferably about 50, per cent solvent, by volume based upon the total volume.

The membranes may, if desired, be advantageously formed on a reinforcing web of paper, felt, fabric or the like, by placing the web on a flat casting surface, pouring the solution of monomeric materials over it, then covering the cast and heating the soltuion until polymerization is complete.

Granular anion exchange materials may be formed in the same general manner as membranes, except that polymerization need not be carried out under conditions preventive of the escape of solvent from the solution, since it is not of great importance whether the polymeric material fractures or not. As anion exchange resins, the insoluble polyelectrolytes of this invention are strongly basic, and when in the hydoxide form, may be used to replace anions in solution with hydroxyl ions. For instance, by contacting sodium chloride solution with such a resin in hydroxide form, a solution of sodium hydroxide is produced.

The term "vinyl equivalent" appearing in the appended claims, refers to the molar quantity of a vinyl compound (mono- or poly-vinyl) having the number of vinyl groups as one mol of a monovinyl compound, e. g. styrene.

Having thus disclosed my invention and described in detail preferred and representative embodiments thereof, I claim and desire to secure by Letters Patent:

1. The method of preparing polyelectrolytes comprising polymerizing an N-alkyl vinyl pyridinium salt with an aromatic vinyl hydrocarbon in the ratio of about one mol of pyridinium salt to each vinyl equivalent of aromatic hydrocarbon.

2. The method of preparing solid insoluble structures permselective to anions comprising polymerizing an N-alkyl vinyl pyridinium salt with an aromatic polyvinyl hydrocarbon in a common solvent under substantially non-evaporative conditions until a solid insoluble infusible copolymer is formed.

3. The method of preparing polyelectrolytes comprising polymerizing a compound containing the structure

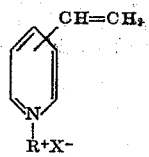

where R is an alkyl group and X is an anion with a compound having an aromatic nucleus to which is joined the group —C=CH$_2$, in the vinyl equivalent proportions of between 2:1 and 8:9.

4. The method of preparing a soluble polyelectrolyte comprising polymerizing a material selected from the group consisting of N-alkyl 2-vinyl pyridinium salts and N-alkyl 4-vinyl pyridinium salts with a material selected from the group consisting of styrene and alpha methyl styrene in the vinyl equivalent proportions of between 2:1 and 8:9.

5. The method of preparing an insoluble polyelectrolyte comprising polymerizing reacting a material selected from the group consisting of N-alkyl 2-vinyl pyridinium salts and N-alkyl 4-vinyl pyridinium salts and N-alkyl 4-vinyl pyridinium salts with divinyl benzene.

6. A polymeric material comprising the polymeric reaction product of an N-alkyl vinyl pyridinium salt and an aromatic vinyl hydrocarbon, said copolymer being substantially free of unalkylated nitrogen atoms and having a molecular weight of about 200,000 or more.

7. A polymeric material containing the structure

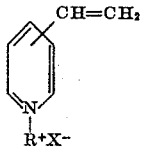

where R is an alkyl group and X is an anion, in copolymeric relation with the structure

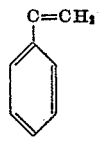

wherein substantially all of the nitrogen atoms are quaternary ammonium groups.

8. A polymeric material comprising the polymerized product of an N-alkyl vinyl pyridinium salt and an aromatic polyvinyl hydrocarbon, wherein substantially all of the nitrogen atoms are quaternary ammonium groups.

9. The method of forming infusible, unfractured, and electrically conductive anion permeable solvated gel structures in the form of membranes comprising: dissolving a material selected from the group consisting of N-alkyl 2 vinyl pyridinium salts, N-alkyl 4-vinyl pyridinium salts, and N-alkyl, 2 vinyl-5 ethyl pyridinium salts with an aromatic polyvinyl hydrocarbon in about 20 to about 70 per cent, by volume on total volume, of a common solvent therefor, disposing the solution to the membrane form, polymerizing the solute under substantially non-evaporative conditions to form a copolymer thereof which is a solid, coherent, uniform, unfractured gel structure, said solvent being one which is capable of being uniformly and homogeneously occluded in said copolymer.

10. As an article of manufacture, a solid, infusible, unfractured structure in the form of a membrane comprising a coherent continuum of an insoluble, infusible polymer which is a copolymer of a N-alkyl vinyl pyridinium salt and an aromatic polyvinyl hydrocarbon, said copolymer being in gel relationship with a solvating liquid which presents a continuous phase throughout said gel.

11. As an article of manufacture, a solid, infusible, unfractured structure in the form of a membrane comprising a coherent continuum of an insoluble, infusible polymer which is a copolymer of a N-alkyl vinyl pyridinium salt and an aromatic polyvinyl hydrocarbon with a reinforcing material imbedded therein, said copolymer being in gel relationship with from about 20 to about 70 per cent, by volume on total volume, of a solvating liquid which presents a continuous phase throughout said gel.

References Cited in the file of this patent

UNITED STATES PATENTS

| | | |
|---|---|---|
| 2,484,420 | Minsk | Oct. 11, 1949 |
| 2,540,985 | Jackson | Feb. 6, 1951 |

OTHER REFERENCES

Butler et al., J. Am. Chem. Soc., 71, 3120–3122 (1949).